Sept. 13, 1960 R. B. MATTHEWS 2,952,409
TEMPERATURE SENSITIVE CONTROL APPARATUS
Filed Nov. 21, 1955 2 Sheets-Sheet 1

INVENTOR.
RUSSELL B. MATTHEWS
BY Seegert & Schwalbach
ATTORNEYS

Sept. 13, 1960 R. B. MATTHEWS 2,952,409
TEMPERATURE SENSITIVE CONTROL APPARATUS
Filed Nov. 21, 1955 2 Sheets-Sheet 2

*INVENTOR.*
RUSSELL B. MATTHEWS
BY
*Seegert & Schwalbach*
ATTORNEYS

United States Patent Office 2,952,409
Patented Sept. 13, 1960

2,952,409

TEMPERATURE SENSITIVE CONTROL APPARATUS

Russell B. Matthews, Wauwatosa, Wis., assignor, by mesne assignments, to Minnesota Mining and Manufacturing Company, St. Paul, Minn., a corporation of Delaware Filed Nov. 21, 1955, Ser. No. 547,990

6 Claims. (Cl. 236—10)

This invention relates to improvements in temperature sensitive control apparatus, and more particularly to apparatus which is responsive to a predetermined rapid rate of temperature change in a given medium, as well as to an extreme in the temperature of said medium.

In certain applications it is desirable to provide means for sensing a dangerously rapid temperature change, for example a temperature rise, in a given medium, or for sensing a dangerously extreme temperature, for example a high temperature in said medium, and to provide means in conjunction with said temperature sensing means for rectifying such a dangerous condition.

With the above in mind, it is a general object of the present invention to provide means for sensing a predetermined rapid rate of temperature change in a medium, regardless of the absolute temperature of the medium, said means including a thermoelectric generator having thermo-junctions subject to the temperature of the medium to be sensed, one of said thermo-junctions being thermally lagged such that upon occurrence of a predetermined rapid rate of temperature change in the given medium, the change in temperature of the lagged thermo-junction lags behind that of the other thermo-junction to create a temperature differential between the thermo-junctions sufficient to generate thermoelectric energy of a magnitude to energize an electroresponsive control device.

A further object of the invention is to provide apparatus of the class described wherein there is adjustable means for varying the effectiveness of the lagging means, to thereby vary the rate of temperature change to which the thermoelectric generator is responsive.

Another object of the invention is to provide control apparatus of the aforementioned character wherein the thermoelectric generator has at least one semi-metallic element rendering said generator highly efficient, said semi-metallic element having relatively low thermal conductivity and being particularly well adapted for use in the aforementioned apparatus.

Another object of the invention is to provide apparatus for sensing a dangerously extreme temperature in a given medium, by utilization of a thermoelectric generator of the class described having thermo-junctions subject to the temperature of the medium to be sensed and also having means for permitting heat transfer from one of said junctions to a second medium having a temperature which is relatively stable with respect to that of the first-mentioned medium, said heat transfer increasing with the differential in temperatures between said media, such that occurrence of a predetermined extreme temperature in the first-mentioned medium, creates a predetermined temperature differential between said thermo-junctions sufficient to generate thermoelectric energy of a magnitude to energize an electroresponsive control device.

A still further object of the present invention is to provide an improved apparatus of the class described wherein a single thermocouple is operable to sense not only a predetermined rapid rate of temperature change in a given medium, but also to sense a predetermined extreme temperature in said medium, and to energize an electroresponsive control device in response to either of said conditions sensed.

Another specific object of the invention is to provide apparatus of the character described wherein means is provided for changing the temperature of the medium, said means being under the control of the electroresponsive control device such that on energization of said control device in response to occurrence of one of the aforementioned temperature conditions, said temperature changing means tends to rectify the condition.

Other and further objects of the invention will become apparent as the description proceeds, reference being had to the accompanying drawings illustrating one complete embodiment of the preferred form of the invention, wherein.

Figure 1:
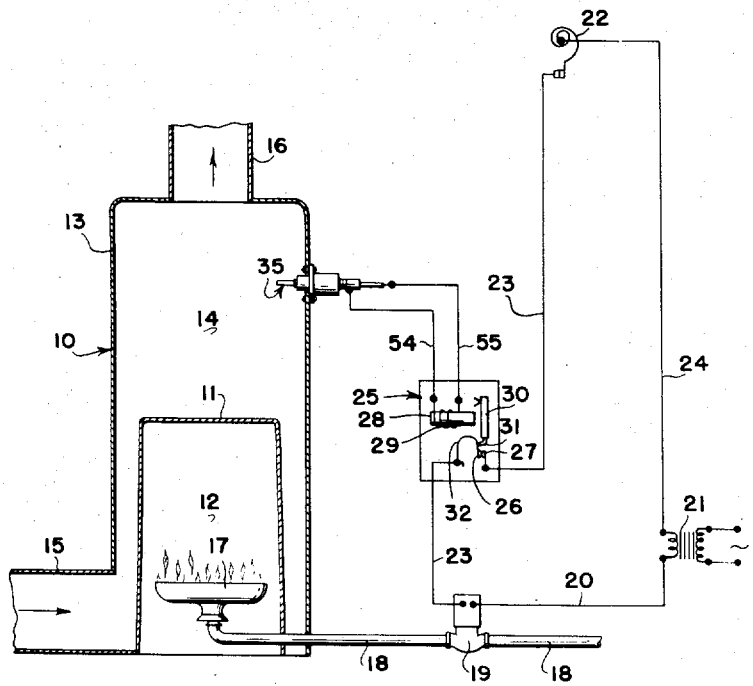
Figure 1 is a semi-diagrammatic showing of one form of the invention applied to a home heating system.

Referring more particularly to Figure 1 of the drawings, and for the purposes of illustration only, one form of the invention is applied to a gaseous fuel burning heating system of the type commonly used for domestic heating purposes. The numeral 10 indicates a furnace of the warm air type having an outer casing 13 and an inner casing 11 spaced therefrom to provide a combustion box 12 and a surrounding fresh air chamber 14. The casing 13 is provided with a cool fresh air inlet 15 and a warm fresh air outlet 16, and means, for example a blower (not shown), may be provided for circulating fresh air through the chamber 14 from the inlet to the outlet. The inlet 15 and outlet 16 may be connected by suitable ducts (not shown) to individual room registers (also not shown) for withdrawal of cool air from and delivery of warm air to the various rooms to be heated.

Disposed within the combustion chamber 12 is a fluid fuel burner 17 which is supplied with fluid fuel from a suitable source through a fuel supply conduit 18 into which an electroresponsive valve 19 is interposed, the latter being of any desired type, for example a solenoid valve. One terminal of the valve 19 is connected in circuit with a source of energizing current, for example the secondary winding of a transformer 21, through a conductor 20, and the other terminal of the valve 19 is connected in circuit with one terminal of a room thermostat 22 through a conductor 23, the other terminal of said thermostat being connected in circuit with the other terminal of the secondary winding of the transformer 21 through a conductor 24. The primary winding of the transformer 21 may be connected to a source of alternating current as shown. If desired, the electroresponsive valve 19 may take the form of a cycling type thermoelectrically powered valve, and the energizing current therefor may be supplied from a thermoelectric generator, subject, for example, to the heat of a pilot burner (not shown) in igniting relation with respect to the main burner 17 in a manner well known in the art. It is thus apparent that the valve 19 can be cycled and fuel supplied to the burner 17 in accordance with the demands of the thermostat 22.

Affording additional control over the valve 19 is a thermoelectrically operated relay 25 the illustrated form of which has contacts 26 and 27 biased toward engaged position and interposed in the conductor 23. The illustrated relay 25 has an electromagnet core 28 provided with an energizing winding 29, and a pivotally mounted armature 30 cooperates with the pole face of the core 28. The armature 30 has a projection 31 engaging a resilient contact supporting and biasing arm 32 which carries the contact 26 and biases the latter toward the contact 27. The arm 32 also biases the armature 30 away from the pole face of the magnet frame 28, and upon energization of the winding 39, the armature is drawn toward said pole face against the bias of said arm. Such movement of the armature flexes the arm 32 toward the left, as viewed in Figure 1, to disengage the contact 26 from the contact 27 and open the circuit to the valve 19, thereby shutting off the flow of fuel to the burner 17.

Mounted on and projecting through a suitable aperture in the casing 13 is a thermoelectric generator 35 which may take the form of a thermocouple of novel construction to be hereinafter more fully described. The terminals of the generator 35, i.e. the lead conductors 54 and 55 thereof to be described hereinafter, are connected for energization of the coil 29 of the relay 25, the conductor 54 being connected to one terminal of the coil 29 and the conductor 55 being connected to the other terminal thereof.

Figure 2:
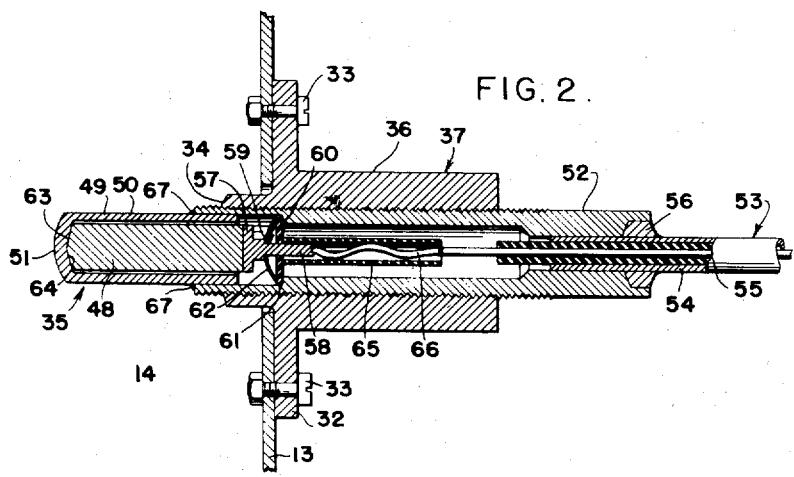
Figure 2 is an enlarged longitudinal sectional view taken through the thermoelectric generator shown in Figure 1.

Referring now to Figure 2 of the drawing, the thermoelectric generator 35 illustrated therein comprises a pair of thermocouple element means 48 and 49, the latter of which takes the form of an elongated generally cup-shaped sheath member, preferably of stainless steel. The sheath 49 has a tubular sleeve portion 50 and an end wall portion 51. The opposite end of the member 49 is telescopically received within a counterbore formed within one end of an extension tube 52 of brass or other suitable material and is sealingly fixed therein, as by silver soldering or brazing at 67. Tube 52 is preferably externally threaded and is adjustably received in the internally threaded bore of a lagging and mounting member 37 provided with a mounting flange 32 for attachment to the casing 13, as by screws 33. The member 37 has an inner end portion 34 of substantial cross-section projecting into the chamber 14 and surrounding the adjacent end of the thermocouple element means 48, and said member also has a portion of still greater cross-section 36 outwardly of the mounting flange 32 both for a purpose to be hereinafter described in detail.

The outer end of the extension tube 52 is formed with the portion of reduced internal diameter to snugly receive one end of a coaxial type thermoelectric generator lead 53, comprising a metallic tubular outer conductor 54 and an insulated coaxial inner conductor 55. The sleeve 52 has an end recess adjacent the lead 53, and said tube and lead are sealingly and electrically connected, for example by silver soldering or brazing, at 56.

The thermocouple element means 48 preferably comprises a rod-like or cylindrical ingot of semi-metallic alloy or composition disposed in coaxial spaced relation within the sheath 49. Because the thermocouple element means 48 is of frangible material, the generator 35 is constructed in a manner to provide shock resistant mounting means therefor. The element means 48 includes an iron contact electrode 57 having a stem portion 58 formed with a shoulder 59. The tube 52 is formed with an internal annular shoulder 60, and surrounding the contact electrode stem portion 58 is an insulating washer 61 engaging the shoulder 60. Interposed between the insulating washer 61 and the stem shoulder 59 is a compression spring 62 which may take the form of a concavo-convex centrally apertured resilient disc also surrounding the electrode stem 58.

A tube 65 of insulating material preferably surrounds the contact electrode stem 58, and a flexible conductor 66 extends within the tube 65 and affords an electrical connection between the stem 58 and the inner conductor 55 of the coaxial lead 63.

The sheath 49 is formed with a conical inner end wall surface 63 and the semi-metallic element 48 is formed with a complementary conical end surface 64 which is seated against the end wall surface 63. The spring 62 exerts compressive stresses on the element 48, which stresses substantially reduce the net tensile stresses to which said element is subjected during transverse acceleration or shock, said compressive stresses not being so high as to exceed the compressive strength of said element. The bias of the spring 62 also provides the pressure necessary for a satisfactory pressure contact between the element 48 and the sheath 49 at the surfaces 63 and 64. The pressure type contact is not deleteriously effected by deformation of the element 48, for example on bending under transverse shock, and the conical nature of the surfaces 63 and 64 tends to maintain the biased element 48 in centered relationship within the tubular portion 50 of the member 49. The compressive stress under which the member 48 is placed increases the magnitude of deformation which said element can withstand without fracture and affords the generator 35 substantial shock resistance.

The thermocouple element 48 may, for example be formed of a semi-metallic alloy or composition which may be characterized as a binary metallic compound of slightly imperfect composition, i.e. containing beneficial impurities constituting departures from perfect stoichiometry by reason of an excess of one of the metals over the other, and/or containing added beneficial impurity substances hereinafter referred to as "promoters." Such semi-metallic compositions have semi-conductor like conductance, both electrical and thermal, and include mixtures of such binary metallic compounds, which may be denominated ternary metallic alloys or compositions. Certain of these alloys or compositions exhibit negative and certain exhibit positive electrical characteristics.

More specifically, the thermocouple element 48 may, for example, be formed of an alloy further described in the copending application of Sebastian Karrer, Serial No. 475,540, filed December 15, 1954, now Patent No. 2,811,570, and assigned to the assignee of the present invention, said alloy comprising lead and at least one member of the group tellurium, selenium and sulphur. For example, the thermoelectric element 48 of lead-selenium-tellurium composition could include a tellurium-selenium constituent in which the selenium is but a trace. In this case such constituent should constitute from 35% to 38.05% by weight of the composition, the balance (61.95% to 65% by weight) being lead. At the other extreme, where the tellurium-selenium constituent consists almost entirely of selenium with but a trace of tellurium, such constituent should comprise from 25% to 27.55% by weight of the final composition, the remainder (from 72.45% to 75% by weight) being lead. Between these two extremes, the selenium-tellurium constituent varies linearly with the ratio of selenium to tellurium (expressed in atomic percent) in the selenium-tellurium constituent.

The thermoelectric element 48 may also be formed of an alloy of lead, selenium and sulphur. For example, a thermoelectric element 48 of the lead-selenium-sulphur composition could consist of a selenium-sulphur constituent in which the sulphur is but a trace. In this case, such constituent should constitute from 25% to 27.55% by weight of the composition, the balance (75% to 72.45% by weight) being lead. At the other extreme, where the selenium-sulphur constituent consists almost entirely of sulphur with but a trace of selenium, such constituent should comprise from 12.8% to 13.37% by weight of the final composition, the remainder (from 87.2% to 86.63% by weight) being lead. Between these two extremes the selenium-sulphur constituent varies linearly with the ratio of solenium to sulphur (expressed in atomic percent) in the selenium-sulphur constituent.

With regard to the aforementioned compositions, it will be observed that in each case there is an excess of lead over and above the amount thereof necessary for satisfying the stoichiometric proportions of the compound formed in the second constituent or constituents, i.e. the tellurium, selenium or sulphur. For example, the composition consisting substantially of lead and selenium can contain up to 10.4% lead by weight of the total composition over and above the 72.41% by weight lead stoichiometrically necessary for combination with selenium.

The electrical characteristics of the aforementioned semi-metallic alloys, desirable, for example in thermoelectric elements, can be markedly and advantageously altered in a reproducible manner by the addition thereto of controlled amounts of matter other than the constituents of the base composition. Such additions may also be designated "beneficial impurities" as distinguished from undesirable impurities. For convenience, these additions are hereinafter designated "promoters" since they tend to enhance the electrical characteristics desired for the particular application of the base composition.

The aforedescribed base compositions exhibit negative thermoelectric power and negative conductivity. By the addition of certain "promoters," such negative properties may be enhanced, while the polarity of the electrical properties of the base composition may be reversed by the addition of certain other promoters. The copending application of Robert W. Fritts and Sebastian Karrer, Serial No. 475,488, filed on December 15, 1954, now Patent No. 2,811,571, and assigned to the assignee of the present application, gives a complete description of the beneficial impurities, including both departures from perfect stoichiometry and promoters, which have been found to be effective for improvement of the electrical properties of semi-metallic thermoelectric generator elements when added to the aforementioned base compositions in minor amounts, for example up to a maximum of 6.9% by weight of beneficial impurity, including 3.9% excess lead and 3.0% promoter.

The proportions and ranges of the various constituents aforementioned and particularly the minimum limits of the lead constituent in the compositions, must be regarded as critical if the composition is to have the electrical and physical properties desired. If the lead content is significantly less than the minimum amount indicated for any particular selenium-tellurium or selenium-sulphur proportion, the polarity of the Seebeck E.M.F. changes and the desired electrical and mechanical properties will not be reproducible. On the other hand, if the lead content of any composition appreciably exceeds the aforementioned maximum limits, the resulting composition is too metallic in nature to afford satisfactory energy conversion efficiencies.

Not only are the proportions and ranges aforedescribed to be considered critical, but so also is the purity. More specifically, the limit of tolerable metallic impurity in non-promoted final compositions has been found to be on the order of 0.01%, and the composition must be substantially oxygen free, if the mechanical and electrical properties desired are to be obtained and to be reproducible. In the case of promoted compositions, however, the limit of tolerable impurity is 0.001%.

In order to utilize any of the aforementioned base alloys or promoted compositions in electrical devices, for example as thermoelectric generator elements, they must necessarily be electrically contacted. As previously pointed out, electrical contact with the ingot 48 is made at one end with the inner wall surface 63 by means of a pressure contact. The electrical contact with the ingot at the opposite end, however, is made by bonding of the contact electrode 57 with the end surface of the ingot 48, and if desired, the aforementioned pressure contact could be replaced by such a bonded contact. In the latter case the element-electrode interface must have a mechanical strength at least comparable to that of the alloy of which the element 48 is made. The contact electrode must be chemically stable with respect to the element 48 and provides the necessary means for connecting said element into its electrical circuit while at the same time chemically isolating said element from the other conductors making up said circuit. Iron is especially pointed out, electrical contact with the ingot 48 is ments 48 of lead-tellurium-selenium composition, and pressure type contacts of carbon are suitable for elements 48 of any of the aforedescribed compositions including those comprising lead and sulphur.

Since, as is well known in the art the electrical and thermal resistances of the thermoelectric generator 35 are dependent upon the configuration thereof, as well as on the electrical and thermal conductivities of the elements 48 and 49, the relationship between the dimensions of each element can be obtained which affords the highest thermal conversion efficiency in such a mounting or assembly. In the embodiment described, the thermal conductivity of the semi-metallic element 48 is low as compared with that of the element 49 (for example .025 watts/cm./° C. as compared to .261 watts/cm./° C.), and this characteristic makes said element particularly well adapted for use in the generator 35.

The conversion efficiency of the thermocouple 35 is dependent upon the difference between the temperatures of the thermo-junctions at the opposite ends of the semi-metallic ingot 48. In the present invention, the entire portion of the thermocouple 35 inwardly of the casing 13 is exposed to the temperature of the medium in the chamber 14, and during normal operation, the temperature of the thermo-junction at the surfaces 63—64 is not sufficiently different from that of the thermo-junction at the juncture of the element 48 with the contact electrode 57 to generate an appreciable thermoelectric current. However, on occurrence of an abnormally rapid change in temperature in the medium 14, for example a temperature rise resulting from failure of the fresh air circulating blower or from closure of a number of the room registers preventing proper circulation of air through the chamber 14, the temperature of the thermo-junction at the contact electrode 57 is prevented from rising rapidly. This is so because the low thermal conductivity of the semi-metallic element 48 prevents conduction of substantial amounts of heat therethrough, and further, the lagging and mounting member 37, by virtue of its relatively large thermal mass, affords means thermally lagging said thermo-junction.

While the thermal lagging thus afforded is provided by the metal member 37 which may be of brass, it is obvious that such thermal lagging could also be afforded by the use of thermal insulating material surrounding the portions of the thermocouple 35 adjacent the thermo-junction at the contact electrode 57. In either case, on occurrence of an abnormally rapid temperature rise, the thermo-junction at the surfaces 63—64 is rapidly heated, whereas the thermo-junction at the contact electrode 57 remains relatively cool due to the aforementioned low thermal conductivity and to the lagging effect of the member 52 which is slow in heating and to which heat is radiated from the thermo-junction at the contact electrode 57.

As a result of the rapid rise in temperature of the medium 14, a temperature differential is produced between the thermo-junctions at the opposite ends of the ingot 48 sufficiently to generate thermoelectric energy of a magnitude to energize the coil 29 of the relay 25 and cause the armature 30 to be drawn to the pole face of the core 28. This armature movement opens the circuit to the electroresponsive valve 19 by disengagement of the contact 26 from the contact 27, and as a result, the valve 19 closes to shut off the flow of fuel to the burner 17 and thereby the supply of heat to the chamber 14.

It will be observed that the speed of response of the instant apparatus increases in accordance with the rate of temperature changes in the medium within the chamber 14. For example, the greater the rate of temperature rise in the medium within the chamber 14, the faster the temperature of the thermo-junction at the surfaces 63—64 rises and the faster the differential between it and the thermo-junction at the electrode 57 increases to the point where sufficient thermoelectric energy is produced for actuation of the relay 25.

As the medium 14 slowly cools following closure of the valve 19, the temperature of the thermo-junction of the surfaces 63—64 slowly approaches that of the thermo-junction at the contact electrode 57. The output of the thermocouple 35 thereupon gradually decreases to the point where the relay 25 drops out and the circuit at the contacts 26—27 is again made, thus placing the operation of the valve 19 under the control of the room thermostat 22.

The specific rate of temperature change to which the thermocouple 35 is responsive, i.e. in response to which it generates sufficient thermoelectric energy for actuation of the relay 25, may be selectively adjusted by relative rotation of the sleeve 52 and lagging and mounting member 37. This changes the axial position of the member 37 with respect to the thermo-junction at the contact electrode 57 and thereby changes the lagging effect produced by said member. If the member 37 is moved toward the aforementioned thermo-junction, the lagging effect is increased, whereas axial movement in the opposite direction decreases the lagging effect produced by the lagging and mounting member.

The improved thermocouple 35 also provides for actuation of the relay 25 and shut off of the fuel to the burner 17 in the event of occurrence of an extreme temperature within the medium 14 independently of the rate of the temperature change producing said temperature. In this sense the improved apparatus functions as a thermostat. As shown in the drawing, a substantial portion of the member 37 and of the extension sleeve 52 is disposed externally of the casing 13 and is exposed to a medium, for example the atmosphere in a basement, which medium has a temperature which is relatively stable with respect to that of the medium in the chamber 14. This exposure provides for the transfer of heat between the member 37 and sleeve 52 and the aforementioned relatively stable medium. The rate of any such heat transfer, of course, increases with the differential in temperature between the medium 14 and the medium surrounding the casing 13, and the thermocouple 35 is so constructed that on occurrence of a predetermined extreme, for example abnormally high, temperature, the rate of heat transfer between the two media is sufficiently high to provide a temperature differential between said thermo-junction at the electrode 57 and the thermo-junction at the surfaces 63—64 great enough to produce thermoelectric energy of a magnitude to energize the relay 25 and interrupt the circuit at the contacts 26 and 27. This, of course, effects closure of the valve 19 and shut off of the fuel to the burner 17. On subsequent cooling of the medium 14, the temperatures of the thermo-junctions at the opposite ends of the ingot 48 again approach one another, and the output of the thermocouple 35 correspondingly decreases to drop out the relay 25 and effect closure of the contacts 26—27 to again place the operation of the valve 19 under the control of the room thermostat 22.

Figure 3:
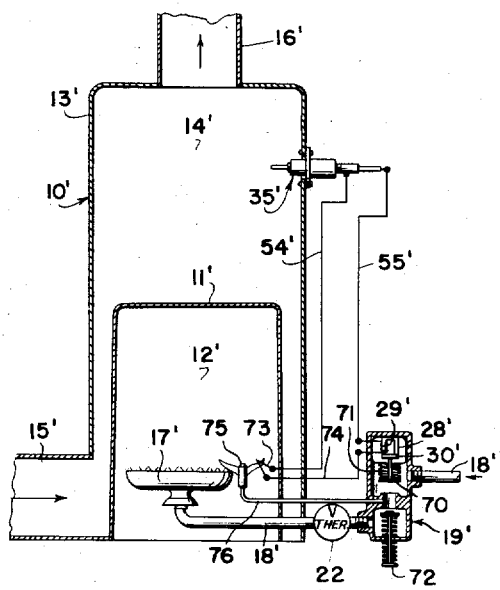
Figure 3 is a semi-diagrammatic showing of another form of the invention applied to a home heating system.

Figure 3 shows another form of the invention applied to a fluid fuel burning heating apparatus. In Figure 3 the elements indicated by primed reference characters correspond to elements indicated in Figure 1 by the same numerals unprimed.

In Figure 3, the valve 19' takes the form of a manually resettable thermoelectrically powered safety shut-off valve, but may, if desired, be a cycling type valve. The flow of fuel to the burner 17 may be thermostatically controlled by a thermostatic valve 22' interposed in the conduit 18' and the latter may have a bulb (not shown) disposed in the space heated by the heating apparatus for response to the temperature of said space.

Fuel flow through the valve 19' is under the control of a valve member 70 biased toward closed position by a spring 71. The valve member 70 is provided with a valve stem which is connected to an armature 30' cooperable with the pole faces of an electromagnet frame 28', the latter being provided with an energizing winding 29' as shown. Manual reset means 72 may be provided for moving the valve 70 to open position and the armature 30' to attracted position with respect to the pole faces of the magnet frame 28', and the winding 29', when energized, is operable to hold the armature 30' in said attracted position and the valve member 70 in open position against the bias of the spring 71.

Means is provided for energizing the winding 29' to thereby normally hold the valve member 70 in open position, said means comprising a thermoelectric generator 73 having one terminal connected in circuit with one end of the winding 29', as by conductor 74, and having its other terminal connected in circuit with one terminal of the thermoelectric generator 35', as by conductor 54'. The other terminal of the thermoelectric generator 35' is connected in circuit with the other end of the winding 29', as by the conductor 55'. It will be observed that the generators 73 and 35' are connected in series circuit relation with respect to the winding 29'. For a reason which will hereinafter appear, the generators 35' and 73 are connected in circuit with each other and with the winding 29' in such a manner that their polarity is reversed and they oppose one another. The generator 73 is subject to the heat of burning fuel at a pilot burner 75 disposed in igniting relation with the main burner 17' and is supplied with fuel through a conduit 76 which enters the body of the valve 19' down stream of the valve member 70 as shown.

During normal operation of the apparatus disclosed in Figure 3, the generator 73 is continuously heated by the heat of burning fuel at the pilot burner 75, and fuel is supplied to the main burner by the thermostatic valve 22' in accordance with the requirements of the space being heated. The winding 29' of the valve 19' is energized by current from the generator 73 and the valve 70 is thereby held in open position. In the event of the occurrence of a predetermined abnormally rapid rise in the temperature within the chamber 14', or on occurrence of a predetermined abnormal extreme temperature in said chamber, the thermoelectric generator 35' generates a current of sufficient magnitude to overcall the generator 73 and neutralize the current supplied thereby sufficiently to effect drop out of the armature 30' and movement of the valve member 70 to closed position under the bias of the spring 71, thereby shutting off all fuel flow to the main and pilot burners. By virtue of the series circuit connection of the generators 35' and 73 with the winding 29', any break in said series circuit, for example in the generator leads, interrupts the energization of the winding 29' to effect closure of the valve member 70 and shut-off of all the fuel flow to the main and pilot burners. The valve 19' is, of course, also responsive to pilot burner outage in that such outage effects cooling of the generator 73 and deenergization of the winding 29' to produce drop out of the armature 30' and closure of the valve member 70.

It is thus apparent that in the improved control apparatus a thermoelectric generator, more particularly a thermocouple of novel construction, is operable to sense predetermined abnormally rapid temperature changes in a given medium regardless of the level of said temperatures, and the same thermoelectric generator is operable to sense a predetermined abnormal extreme in the temperature of the given medium, said generator in each case being operable to energize and actuate control apparatus for rectification of the abnormal condition sensed.

Having thus described two embodiments of the present invention, it is to be understood that the illustrated forms were selected to facilitate the disclosure of the invention, rather than to limit the number of forms which it may assume. Various modifications, adaptations and alterations may be applied to the specific forms shown to meet the requirements of practice without in any manner departing from the spirit or scope of the present invention, and all of such modifications, adaptations and alterations are contemplated as may come within the scope of the appended claims.

What is claimed as the invention is:

1. In combination, an enclosure for a medium to be heated, means including a burner for supplying heat to said medium, a thermoelectric generator comprising a metallic sheath projecting part way into said enclosure, said generator having a first thermojunction at the end of said sheath disposed within said enclosure subjected to the temperature of said medium, said generator also having at least one other thermojunction, electroresponsive fuel control means for controlling the flow of fuel to said burner, said control means including a fuel control valve having an energizing circuit and having an energized open position and a deenergized closed position, and a relay in circuit with said generator and having contacts in said control valve energizing circuit, said relay contacts having a circuit-making position in which they are normally disposed for energization and open disposition of said valve when the output of said generator is below a predetermined level and having a circuit-interrupting position in which they are disposed to effect deenergization and closure of said valve when the output of said generator attains said predetermined level, said generator having a normal output less than said predetermined level for disposition of said contacts in circuit-making position and flow of fuel to said burner, and thermal lagging means surrounding said sheath in heat absorbing relation with respect to said other generator thermojunction and having a major portion thereof disposed externally of said enclosure and substantially out of the heating influence of said burner, wherefore on a rise in the temperature of said medium at a predetermined abnormally rapid rate, the corresponding rise in the temperature of the lagged thermojunction proceeds at a slower rate than that of the first thermojunction to create a temperature differential therebetween sufficient for generation of thermoelectric energy at said predetermined level for movement of said contacts to circuit-interrupting position and shutoff of the fuel flow to said burner.

2. In combination, a thermoelectric generator having a tubular metallic sheath comprising a first thermoelement, a second rod-like thermoelement disposed coaxially within said sheath and joined to said first thermoelement to form therewith a single temperature sensing thermojunction at one end of said sheath, means joined to said thermoelements to form adjacent inner and outer second thermojunctions spaced axially from said temperature sensing thermojunction, a thermal lagging member of relatively large heat capacity surrounding said sheath adjacent and in heat absorbing relation with respect to both of said second thermojunctions, and means adapted for mounting of said generator and thermal lagging member on an apertured enclosure with said one end of said sheath and said temperature sensing thermojunction projecting through an aperture and disposed within said enclosure and with at least the major portion of said thermal lagging member disposed externally of said enclosure for minimum exposure to the temperature therewithin, said major portion being substantially uninsulated for exposure to the ambient atmosphere thereat.

3. In combination, a thermoelectric generator having a tubular metallic sheath comprising a first thermoelement, a second rod-like thermoelement disposed coaxially within said sheath and joined to said first thermoelement to form therewith a single temperature sensing thermojunction at one end of said sheath, means joined to said thermoelements to form adjacent inner and outer second thermojunctions spaced axially from said temperature sensing thermojunction, a metallic thermal lagging member of relatively large heat capacity having a bore in which said generator is threadedly received, said lagging member surrounding said sheath adjacent and in heat absorbing relation with respect to both of said second thermojunctions, and means adapted for mounting of said generator and thermal lagging member on an apertured enclosure with said one end of said sheath and said temperature sensing thermojunction projecting through an aperture and disposed within said enclosure and with at least the major portion of said thermal lagging member disposed externally of said enclosure for minimum exposure to the temperature therewithin, said major portion being substantially uninsulated for exposure to the ambient atmosphere thereat, threaded adjustment of the position of said thermal lagging member with respect to said second thermojunctions affording an adjustment of the lagging effect afforded thereby to said second thermojunctions.

4. A control apparatus comprising, in combination, an apertured enclosure having a medium therein, a thermoelectric generator having a tubular metallic sheath comprising a first thermoelement, a second rod-like thermoelement disposed coaxially within said sheath and joined to said first thermoelement to form therewith a single temperature sensing thermojunction at one end of said sheath, means joined to said thermoelements to form adjacent inner and outer second thermojunctions spaced axially from said temperature sensing thermojunction, a metallic thermal lagging member of relatively large heat capacity surrounding said sheath adjacent and in heat absorbing relation with respect to both of said second thermojunctions, said thermal lagging member having means mounting said thermal lagging member on the exterior of said enclosure for minimum exposure to the temperature therewithin and over an aperture therein for projection of said one end of said sheath and said temperature sensing thermojunction through said aperture and within said enclosure to be subject to the temperature of the medium therein, said thermal lagging member being substantially uninsulated for exposure to the ambient atmosphere external to said enclosure.

5. Control apparatus comprising, in combination, an apertured enclosure having a medium therein, a thermoelectric generator having a tubular metallic sheath comprising a first thermoelement, a second rod-like thermoelement disposed coaxially within said sheath and joined to said first thermoelement to form therewith a single temperature sensing thermojunction at one end of said sheath, means joined to said thermoelements to form adjacent inner and outer second thermojunctions spaced axially from said temperature sensing thermojunction, a tubular metallic thermal lagging member of relatively large heat capacity threadedly surrounding said sheath adjacent and in heat absorbing relation with respect to both of said second thermojunctions, said thermal lagging member having means mounting said thermal lagging member on the exterior of said enclosure for minimum exposure to the temperature therewithin and over an aperture therein for projection of said one end of said sheath and said temperature sensing thermojunction through said aperture and within said enclosure to be subject to the temperature of said medium therein, said thermal lagging member being substantially uninsulated for exposure to the ambient atmosphere external to said enclosure, threaded adjustment of the position of said sheath axially with respect to said thermal lagging member affording an adjustment of the lagging effect afforded to said second thermojunctions by said lagging member.

6. In combination, an apertured enclosure for a medium to be heated, means for heating said medium, electroresponsive control means for said heating means, a thermoelectric generator having a tubular metallic sheath comprising a first thermoelement, a second rod-like thermoelement disposed coaxially within said sheath and joined to said first thermoelement to form therewith a single temperature sensing thermojunction at one end of said sheath, means joined to said thermoelements to form adjacent inner and outer second thermojunctions spaced axially from said temperature sensing thermojunction, said last-mentioned means connecting said thermoelements in circuit with said control means for energization of the latter, a thermal lagging member of relatively large heat capacity surrounding said sheath adjacent and in heat absorbing relation with respect to both of said second thermojunctions, and means mounting of said generator and thermal lagging member on said enclosure with said one end of said sheath and said temperature sensing thermojunction projecting through said aperture and disposed within said enclosure for exposure to the temperature of said medium and with at least the major portion of said thermal lagging member disposed externally of said enclosure and substantially out of the heating influence of said heating means, said major portion being substantially uninsulated for exposure to the ambient atmosphere thereat, said generator having a normal output less than said predetermined level, said control means having a control member having a first position permitting operation of said heating means and in which it is normally disposed when the output of said generator is below said predetermined level, said control member also having a second position preventing operation of said heating means and in which it is disposed when the output of said generator attains said predetermined level, wherefore on a rise in the temperature of said medium at a predetermined abnormally rapid rate the lagging afforded to said second thermojunctions by said thermal lagging member causes a temperature differential between said second thermojunctions and sensing thermojunction sufficient for generation of thermoelectric energy at said predetermined level and disposition of said control member in its second position preventing operation of said heating means.

References Cited in the file of this patent

UNITED STATES PATENTS

| | | |
|---|---|---|
| 853,505 | Eddy | May 14, 1907 |
| 880,272 | Bristol | Feb. 25, 1908 |
| 1,650,622 | Geissinger | Nov. 29, 1927 |
| 2,076,211 | Straatman | Apr. 6, 1937 |
| 2,183,827 | Thornbery | Dec. 19, 1939 |
| 2,261,343 | De Florez | Nov. 4, 1941 |
| 2,304,489 | Wetzel | Dec. 8, 1942 |
| 2,312,671 | Otto | Mar. 2, 1943 |
| 2,385,530 | Paille | Sept. 26, 1945 |
| 2,397,756 | Schwarz | Apr. 2, 1946 |
| 2,413,128 | Wills | Dec. 24, 1946 |
| 2,420,043 | Johnson | May 6, 1947 |

FOREIGN PATENTS

| | | |
|---|---|---|
| 213,868 | Great Britain | Apr. 7, 1924 |

OTHER REFERENCES

Biggs et al.: "A Method of Controlling Rate of Change of Temperature," pages 109–111 of the Journal of Scientific Instruments for March 1949.

UNITED STATES PATENT OFFICE
CERTIFICATE OF CORRECTION

Patent No. 2,952,409          September 13, 1960

Russell B. Matthews

It is hereby certified that error appears in the above numbered patent requiring correction and that the said Letters Patent should read as corrected below.

Column 4, line 71, for "solenium" read -- selenium --; column 6, line 5, for "pointed out, electrical contact with ingot 48 is" read -- adapted for use as contact electrode material for ele- --.

Signed and sealed this 17th day of October 1961.

(SEAL)
Attest:

ERNEST W. SWIDER
Attesting Officer

DAVID L. LADD
Commissioner of Patents

USCOMM-DC